(12) United States Patent
Stokking et al.

(10) Patent No.: US 11,659,150 B2
(45) Date of Patent: May 23, 2023

(54) AUGMENTED VIRTUALITY SELF VIEW

(71) Applicant: Koninklijke KPN N.V., Rotterdam (NL)

(72) Inventors: Hans Maarten Stokking, Wateringen (NL); Milan Wijnmalen, Utrecht (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 0 days.

(21) Appl. No.: 17/117,764

(22) Filed: Dec. 10, 2020

(65) Prior Publication Data

US 2021/0195157 A1 Jun. 24, 2021

(30) Foreign Application Priority Data

Dec. 19, 2019 (EP) .................................... 19218242

(51) Int. Cl.
*G06T 15/00* (2011.01)
*H04N 13/111* (2018.01)
*G06T 7/194* (2017.01)
*G06T 7/174* (2017.01)
*H04N 13/344* (2018.01)
(Continued)

(52) U.S. Cl.
CPC ............ *H04N 13/111* (2018.05); *G06T 7/174* (2017.01); *G06T 7/194* (2017.01); *H04N 13/344* (2018.05); *H04N 13/366* (2018.05); *H04N 2013/0085* (2013.01)

(58) Field of Classification Search
CPC .. H04N 13/111; H04N 13/344; H04N 13/366; H04N 2013/0085; G06T 7/174; G06T 19/006; G06T 7/194; G02B 2027/0138; G02B 27/0093;
(Continued)

(56) References Cited

U.S. PATENT DOCUMENTS 10,019,057 B2 * 7/2018 Osman ............... G02B 27/0093
10,162,185 B2 * 12/2018 Usami ....................... G09G 5/00
(Continued)

OTHER PUBLICATIONS

Steinicke F, Bruder G, Hinrichs K, Kuhl S, Lappe M, Willemsen P. Judgment of natural perspective projections in head-mounted display environments. InProceedings of the 16th ACM Symposium on Virtual Reality Software and Technology Nov. 18, 2009 (pp. 35-42).*

(Continued)

*Primary Examiner* — Phu K Nguyen
(74) *Attorney, Agent, or Firm* — Hamilton, Brook, Smith & Reynolds, P.C.

(57) ABSTRACT

A processor system processes image data for rendering a virtual environment for a user present in a real environment. The system receives head tracking data indicative of the orientation of the head of the user. An image processor generates image data for rendering a viewport of the virtual environment on a display system based on the head tracking data. A real-view area is defined in the virtual environment, having at least one boundary. The boundary corresponds to predetermined coordinates in the virtual environment. Thereby a corresponding part of the real environment is made visible in the real-view area, the part showing the real environment as perceived from the user head pose. Effectively the virtual environment is augmented by integrating part of the real environment via the real-view area.

16 Claims, 14 Drawing Sheets

(51) Int. Cl.
  *H04N 13/366* (2018.01)
  *H04N 13/00* (2018.01)
(58) Field of Classification Search
  CPC ...... G02B 2027/014; G02B 2027/0187; G02B 27/0172; G06F 3/012
  USPC ........................................................ 345/418
  See application file for complete search history.

(56) References Cited

U.S. PATENT DOCUMENTS

| | | | | |
|---|---|---|---|---|
| 10,430,018 | B2* | 10/2019 | Black | A63F 13/211 |
| 10,477,157 | B1* | 11/2019 | Shahdi | H04N 13/239 |
| 10,747,301 | B2* | 8/2020 | Shipes | G06F 3/0346 |
| 10,795,433 | B2* | 10/2020 | Yang | G06F 3/012 |
| 10,845,601 | B1* | 11/2020 | Meier | G02B 27/0172 |
| 10,855,978 | B2* | 12/2020 | Sutter | G06F 3/013 |
| 11,109,092 | B2* | 8/2021 | Stokking | H04N 21/8456 |
| 2002/0105482 | A1* | 8/2002 | Lemelson | G06F 3/013 345/7 |
| 2010/0115411 | A1* | 5/2010 | Sorokin | H04N 5/2627 715/723 |
| 2012/0086624 | A1* | 4/2012 | Thompson | G02B 27/017 345/8 |
| 2012/0243729 | A1* | 9/2012 | Pasquero | G06F 3/013 382/103 |
| 2014/0361976 | A1 | 12/2014 | Osman et al. | |
| 2014/0364212 | A1 | 12/2014 | Osman et al. | |
| 2017/0287215 | A1 | 10/2017 | Lalonde et al. | |
| 2018/0116613 | A1* | 5/2018 | Von Berg | A61B 8/40 |
| 2019/0310472 | A1* | 10/2019 | Schilt | H04N 19/597 |

OTHER PUBLICATIONS

Grubert J, Heinisch M, Quigley A, Schmalstieg D. Multifi: Multi fidelity interaction with displays on and around the body. InProceedings of the 33rd Annual ACM Conference on Human Factors in Computing Systems Apr. 18, 2015 (pp. 3933-3942).*

Orlosky J, Toyama T, Kiyokawa K, Sonntag D. Modular: Eye-controlled vision augmentations for head mounted displays. IEEE transactions on visualization and computer graphics. Jul. 22, 2015;21(11):1259-68.*

European Search Report for European Application No. 19218242.6, entitled "Augmented Virtuality Self View," dated Jun. 4, 2020.

Budhiraja et al., "Where's My Drink? Enabling Peripheral Real World Interactions While Using HMDs," University of Illinois at Urbana-Champaign, Urbana, Illinois, arXiv:1502.04744v1 [cs.HC] Feb. 16, 2015.

Gunther et al., "Aughanded Virtuality—The Hands in the Virtual Environment," IEEE Virtual Reality Conference 2015, Mar. 23-27, Aries, France, pp. 327-328.

Kanamori et al., "Obstacle Avoidance Method in Real Space for Virtual Reality Immersion," 2018 IEEE International Symposium on Mixed and Augmented Reality (ISMAR), pp. 80-89, IEEE (2018).

McGill et al., "A Dose of Reality: Overcoming Usability Challenges in VR Head-Mounted Displays," CHI 2015, Seoul, Republic of Korea, Apr. 18-23, 2015. pp. 2143-2152.

Milgram et al., "Augmented Reality: A class of displays on the reality-virtuality continuum," SPIE, vol. 2351, Telemanipulator and Telepresence Technologies (1994), pp. 282-292.

Simsarian et al., "Windows on the World: An example of Augmented Virtuality," Swedish Institute of Computer Science, Stockholm, Sweden (1997).

Suma et al., "Sharing Space in Mixed and Virtual Reality Environments Using a Low-Cost Depth Sensor," IEEE International Symposium on Virtual Reality Innovation, Mar. 19-20, 2011, Singapore, pp. 353-354, IEEE (2011).

Von Willlich et al., "You Invaded my Tracking Space! Using Augmented Virtuality for Spotting Passersby in Room-Scale Virtual Reality," Conflicting with Digital Worlds, DIS '19, Jun. 23-28, 2019, San Diego, CA, USA, pp. 487-496.

* cited by examiner

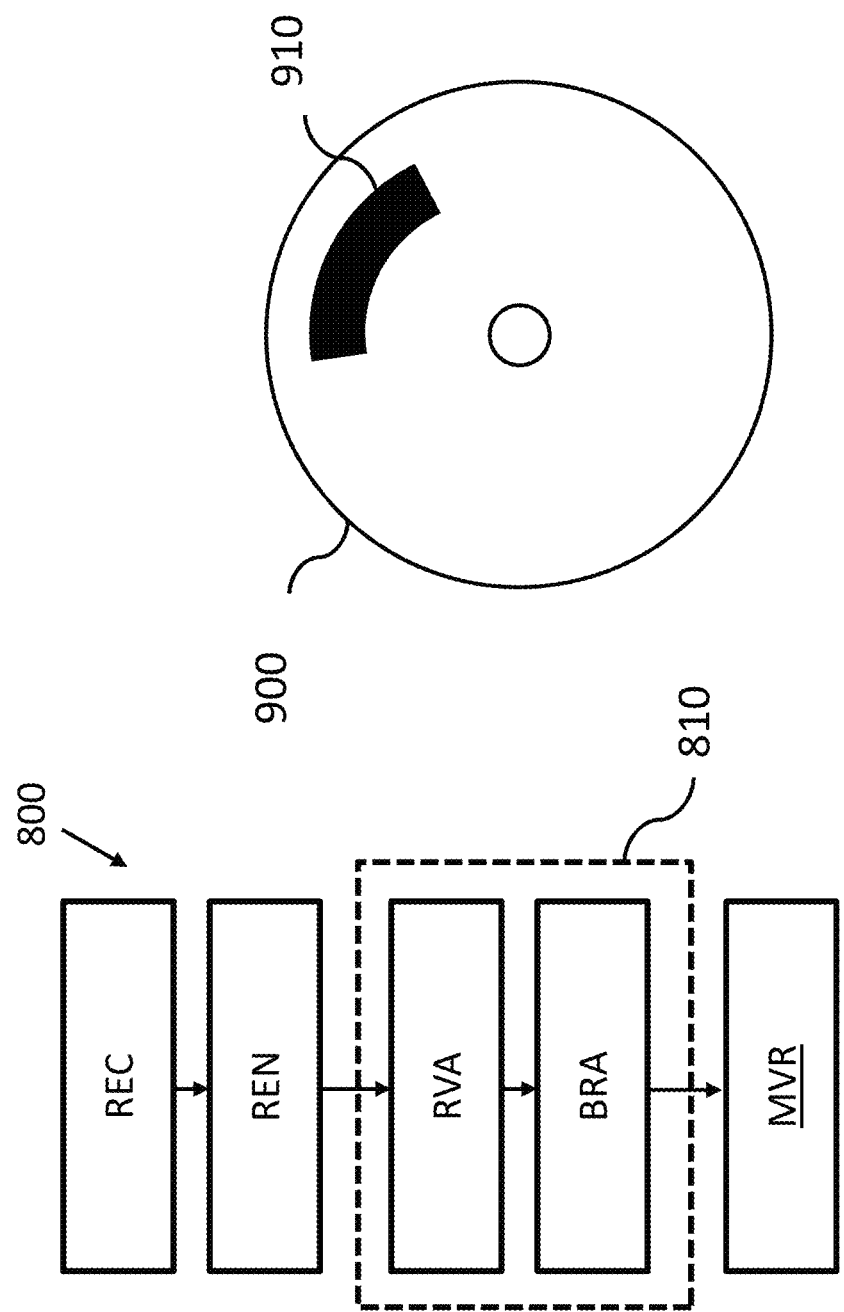

AUGMENTED VIRTUALITY SELF VIEW

RELATED APPLICATION

This application claims priority under 35 U.S.C. § 119 or 365 to European Application No. 19218242.6, filed Dec. 19, 2019. The entire teachings of the above application are incorporated herein by reference.

TECHNICAL FIELD

The invention relates to a processor system for processing image data for rendering a virtual environment on a display system. The invention further relates to a head mounted device, processing methods and computer programs comprising instructions for causing a processor system to perform the methods.

The invention relates to the field of providing a virtual reality (VR) environment, in which (parts of) the user or other objects that are present in a physical space like a room may be shown. Such an environment may be called an augmented VR environment, also called Augmented Virtuality (AV). AV may be provided to a user via a Head Mounted Device (HMD) having a display system.

BACKGROUND ART

In the area of mixed reality, various combinations of mixing real world/object views and virtual world/object views are known, see reference [1], such as Reality, i.e. the 'normal' direct real-world view;

Augmented Reality (AR), i.e. a real-world view, but with virtual objects added. This can be achieved with a see-through display, either optical (HoloLens, Magic Leap) or video see-through (e.g. using a ZED mini camera on a VR HMD);

Augmented Virtuality (AV), where a virtual world is augmented with real-world objects. This can again use a camera or other sensor mounted on a VR HMD, or with a separate sensor system;

Virtual Reality, where the entire view offered is virtual, without any real-world objects;

A reason for AV may be offering a view of other people in the physical room, so you can interact with them. Also, a 'self view' of the user may be provided, e.g. hands of the user and objects in the immediate environment, such as a keyboard or a coffee cup. For using AV, people may use a camera and/or depth sensor on a VR HMD. This allows for capture of the real world from the perspective of the user, allowing for easy translation of captured images to the proper rendering in the virtual environment.

Other approaches for showing real world objects include the following. A chroma-keying method (i.e. 'green screen') may be used to distinguish foreground objects (to be placed in the virtual environment) from the background, e.g. see study 2 and FIG. 7 in reference [2]. Reversed chrome-keying, also called color segmentation, may be used to put objects with certain colors in virtual reality, e.g. see [3] and [4]. Also, overlaying a point cloud of the environment on top of the virtual environment may be used, allowing users to see the virtual environment through the gaps in the point cloud, e.g. see [5]. Also, objects may be detected or separated from their environment, e.g. using Kinect skeleton detection to separate a person from the background, see reference [6]. Separation may also be based on depth difference between foreground and background, see e.g. [7]. Also, predefined windows may be used to display camera data from the physical reality, e.g. see [8].

However, the known approaches are limited in their applicability, and they influence the performance in the sense of required processing and reality-to-VR latency. In general, required processing leads to additional latency, unless all data is processed in between rendering 2 frames, i.e. $\frac{1}{60}$ or $\frac{1}{90}$ of a second. The following table indicates the limitations of known techniques:

| Approach | Limitation(s) |
| --- | --- |
| Chroma-keying | Image processing required to segment foreground/background<br>Limited in applicability, i.e. specific background required |
| Color-segmentation | Image processing required to segment foreground/background.<br>Limited in applicability, i.e. only works for specific objects |
| Point cloud overlay | Image processing required to create point cloud<br>Very distracting when it obscures too much of the virtual environment |
| Object detection | Image processing required to detect objects<br>Specific detection algorithms needed for different objects |
| Depth separation | Depth processing required to perform separation<br>Limited in applicability, i.e. cannot separate objects close in depth if based on IR depth camera, and usually does not work in very short ranges |
| Pre-defined windows | Limited in applicability for dynamic objects, as the windows are pre-defined |

Any real-world capture put into a virtual environment will suffer from some delay. When rotating the head, head rotations latencies (or motion-to-photon latencies) play a big role here. If the virtual environment is updated immediately, i.e. within 20 ms, and the captured object is updated with more latency, e.g. 150 ms (see e.g. [4]), objects quickly appear to 'swim' or 'float' a little. Their placement inside the user's view of the virtual environment is lagged. The larger the delay, the stronger this effect, which may also lead to forms of VR/motion sickness.

Furthermore, inaccuracies in foreground/background segmentation may lead to weird effects. For example, the hands of the user from the user's perspective may be above a virtual object. But, if the segmentation (e.g. using depth) erroneously includes the area between the hands as foreground, a virtual object or part of the virtual environment disappears in this area.

SUMMARY

An exemplary purpose for displaying objects of the real world is to create a self-view, which is a 3D representation of (parts of) the user's own body, which self-view may be made visual through a VR headset (also called HMD). In this document, the real-world object, e.g. the user's body or head, or any other element in a room or location captured by a camera may be named: an object in the physical space. A self-view is an example of a displayed object that corresponds to the actual user in a room where the camera is placed. A self-view may include a view of further local physical objects such as a chair, desktop, etc. The self-view in the virtual environment should be well aligned with the user's body, i.e. well aligned with the actual physical presence, e.g. size, shape, position and orientation, of the physical object Hence there may be a need for a system that offers a fast and correct self-view using limited processing.

In accordance with a first aspect of the invention, a processor system may be provided for processing image data for rendering a virtual environment on a display system for a user, the user being present in a real environment, wherein the processor system comprises an interface for receiving head tracking data from a head tracking system, wherein the head tracking data is indicative of at least the orientation of the head of the user in the real environment, and an image processor configured to:

generate image data for rendering a viewport of the virtual environment on the display system, the viewport being generated based on the head tracking data, define at least one real-view area in the virtual environment, determine at least one boundary of the real-view area, the boundary corresponding to predetermined coordinates in the virtual environment, for making visible a corresponding part of the real environment in the real-view area, the part showing the real environment as perceived from the user head pose.

In accordance with a further aspect of the invention, a computer implemented processing method is provided for processing image data for rendering a virtual environment on a display system for a user, the user may be present in a real environment, wherein the method comprises receiving head tracking data from a head tracking system, wherein the head tracking data is indicative of at least the orientation of the head of the user in the real environment, generating image data for rendering a viewport of the virtual environment on the display system, the viewport being generated based on the head tracking data, defining at least one real-view area in the virtual environment, and determining at least one boundary of the real-view area, the boundary corresponding to predetermined coordinates in the virtual environment, for making visible a corresponding part of the real environment in the real-view area, the part showing the real environment as perceived from the user head pose.

Furthermore, there is provided a transitory or non-transitory computer-readable medium comprising a computer program, the computer program comprising instructions for causing a processor to perform the above method.

The part of the virtual environment that is displayed on the display system for the user is called viewport. The viewport is determined based on the field of view of the display system used and of the head tracking data, so the viewport moves corresponding to head movements like rotation and pitch. The virtual environment may be defined with respect to a coordinate system, while the orientation of the head of the user is tracked by a tracking system, e.g. in a HMD (inside-out tracking) or with one or more separate sensors (i.e. outside-in tracking) or a combination thereof. The tracking data are used to determine the viewport. The tracking system provides tracking data indicative of at least the orientation, e.g. in horizontal degrees and/or vertical degrees compared to the 0-axis and forward direction of the head (usually called north or 0-degrees). For moving users, the tracking data may include using the position of the head in the physical space, e.g. detected via the HMD, i.e. taking into account the head translation on the 3 axes.

The measures in the various systems, devices and methods as mentioned above may have the following effect. At least one area may be created at predetermined coordinates in the virtual environment. The area shows the real environment as perceivable by the user, and is called real-view area or (in short) view-area. The real-view area may be absent of virtual objects. The real-view area has a predetermined position in the virtual environment. The real-view area may have a fixed position with respect to said coordinate system of the virtual environment, so it changes together with the viewport when the user head orientation changes. For example, the real-view area may show a table or desktop that has a fixed position in the physical space.

Due to the coordinates of the boundary of the view-area being predetermined in the virtual environment, the view-area is at a predetermined position in the virtual world. As the real environment is shown in the view area as if it was perceived directly by the user from the user's pose in the real environment, the user will have a self-view and a view of other real-world objects in the view area at the correct scale and orientation, i.e. corresponding to the orientation of the head. Advantageously, the part of the real environment showing via the view-area will be perceived as an integral part of the virtual environment.

The coordinates of the boundary may be determined in angular direction in the virtual environment. Changing the orientation of the head results in adapting the viewport correspondingly, while the real-view area moves together with the viewport and shows the same part of the real environment. However, when the user moves his head by a translation to a different position, a different part of the real environment may be visible via the real-view area. The view-area itself may then remain at the same location in the viewport. Alternatively, the angular coordinates of the boundary may be determined at a nominal angular direction in the virtual environment with respect to a nominal position of the head. The angular direction of the boundary may then be adapted in accordance with a translation of the head. If this is done while taking into account the distance to the real-world object(s), the same (part of) real-world object(s) will remain visible. Optionally, the coordinates of the boundary may be predetermined in a 3D coordinate system of the virtual environment, the boundary having a predetermined direction and distance with respect to the origin of the coordinate system. Actually, the real-view area then constitutes a window like area at a distance from the user's head. If the position of the head changes by translation, the real-view area will remain at the same position in the 3D virtual environment, so in the viewport the size and position of the real-view area appear to change corresponding to the changed position of the user's head in the virtual environment.

The display system may be any type of display, e.g. a display for 2D images, 3D images, a volumetric, holographic, light field type, etc. The display system may be integrated in a head mounted device (HMD) or display(s) may be positioned in a space where the user may observe the display(s).

The tracking data may be indicative of the orientation of the head of the user, but may also be extended to include data regarding a pose of the head. In general, the pose is an object's position and orientation in the physical space, or relative to a further object. The pose of the object may be translated into a pose in the virtual environment, in particular, such that the user's view of the virtual environment provides a correct user experience corresponding to the head movements in the real environment.

It is noted that, when the user changes the orientation of his head, the real-view area may be (partly) removed from the viewport, as the boundary between the real-view area and the virtual environment is positioned at predetermined coordinates of the virtual environment.

Making visible a corresponding part of the real environment in the real-view area means that the user will see, in that section of the viewport, the real environment as far as it would be visible from the user's position. So, the part shows the real environment as perceived from the user head pose in the real environment, i.e. at the correct scale and perspective. The real-view area is a part of the displayed viewport that is filled with the image of the real environment, for example by displaying data captured by a camera present in the real environment or by having the respective part of the display being substantially transparent so that the real environment is directly visible there. A camera may be either a single camera or multiple cameras, and/or further sensors such as distance detectors, operating together to provide 2D or 3D image data of the real environment.

Advantageously, making visible the real environment in the real-view area requires little or no image processing, so delay can be kept to a minimum. In practice, this enables low delays, e.g. 50 ms or less for high-frame-rate cameras or rolling shutter cameras. Also, in the real-view area, there may not be any combination of real and virtual objects, so avoiding undue effects do to segmentation errors of any kind. Moreover, for a camera on a HMD, the camera view is correct for the user, i.e. there is no need for calibration to properly place 3D objects detected in the proper place. This allows good hand-eye coordination, for e.g. writing or picking up objects.

In an embodiment of the processor system, wherein the at least one boundary comprises a separating line horizontal with respect to the virtual environment, while the real-view area is below the separating line. The predetermined coordinates in the virtual environment may be set in relation to the real world, e.g. a boundary set at a horizontal line at one or more predetermined coordinates. Such boundary may in the viewport correspond to a horizontal line at −30 degrees down from the nominal pose of the head. The boundary may be set in relation to a part of the real environment that is relevant for the user, e.g. a desktop where the user can see one or more of his/her hands, a keyboard, a laptop, a document, a coffee cup etc. The real world is then shown below the boundary, while the virtual environment is shown above the boundary. In another case, the real world may be shown above the boundary and the virtual environment below.

In an embodiment of the processor system, wherein the at least one boundary comprises a left separating line vertical with respect to the virtual environment and a right separating line vertical with respect to the virtual environment, the real-view area is between the left and right separating lines. In the embodiment, the boundary includes two vertical lines at −45 degrees and +45 degrees from the nominal north direction of the head. The view area may, for example, show an operating panel in the real environment, while showing a machine that is operated in the virtual environment beside the panel.

In an embodiment of the processor system, the processor system comprises a camera interface for receiving camera data of the real environment as perceived from the user head pose from a camera mounted on the head of the user, and the image processor is arranged to show said part of the real environment in the real-view area based on the camera data. Advantageously, as the camera provides camera data representing the real environment as perceived from the user's head, little or no processing is required for generating display data for the real-view area. This may take into account camera characteristics such as the focal length of the camera and the exact physical placement of the camera relative to the user's head, or more specifically the user's eyes. Optionally, the image processor may be configured to modify the camera data by adapting the scale or perspective for showing image data of the real environment as perceived from the user head pose, optionally taking into account said camera characteristics. For example, a shift or scaling of the camera data may be executed to accommodate for the difference in position of the camera (or cameras) with respect to the eyes of the user.

In an embodiment, the image processor is configured to generate a data plane showing the camera data at least in the real-view area, and generate the image data of the virtual environment over the data plane outside of the real-view area, the data plane moving with respect to the real environment with head rotations and translations as indicated by the head tracking data. The plane does not move with respect to where the user looks, i.e. the plane is always straight in front of the user. Effectively, the plane does move with respect to the real environment (and equally with respect to the virtual environment).

In an embodiment, the image processor is configured to generate a local plane in the virtual environment on the position of the real-view area, and to show the camera data to the extent the camera data overlaps with the local plane.

In an embodiment, the image processor is configured to create a transition by showing, on and/or near the boundary, a combination of the virtual environment and the real environment. For example, to create the transition, the image processor may be configured to blend, near the boundary, image data of the virtual environment and the real environment. Advantageously, the transition may achieve an improved integration of the real-view area in the virtual environment.

In an embodiment, the image processor is configured to modify the coordinates of the boundary in the virtual environment based on a change of the position of the user in the real environment. Advantageously, when the user changes his position in the real environment, e.g. walks to a chair, the position and/or size of the real-view area in the viewport may be adapted correspondingly, i.e. so that the part of the real world that is shown is adapted to the new position of the user.

For example, when the user changes from sitting to standing, the pose of the head with respect to a desktop in the real-view area changes. The horizontal boundary may remain at the same predetermined coordinate while in the viewport it may change, e.g. to −45 degrees. In another example a standing user in a VR game environment may see the real world below −70 degrees, so that he sees himself when looking down, while being immersed in the virtual environment when looking around. A horizontal boundary is positioned at −70 degrees and in all directions, i.e. 360 degrees. By looking down the orientation of the head changes, and the tracking data may for example indicate a pitch of −45 degrees. The position of the boundary in the viewport may then move upwards by said amount, and the user would see a larger part of his own body and less of the virtual environment.

In an embodiment, wherein the boundary comprises a horizontal boundary, the processor system is configured to maintain at least a part of the real-view area in the viewport by moving the horizontal boundary in the virtual environment when the pitch of the head of the user as indicated by the tracking data exceeds a predetermined limit. Depending on the position of the horizontal boundary, an extreme user head pose might result in the virtual environment completely moving out of sight, e.g. when the user look's straight down. In the embodiment, to avoid that the real-view area becomes too large or too small, the boundary may be modified depending on the user's head pose. In the example of looking straight down, the horizontal boundary may be lowered in the virtual environment, or brought closer to the user, such that the horizontal boundary remains in the viewport, and part of the virtual environment remains visible. Other variations are possible as well. For example, when looking straight up, the horizontal boundary may be modified, i.e. effectively put higher in the virtual environment, such that it remains within the viewport and at least part of the real-view area remains visible in the bottom part of the viewport.

In accordance with a further aspect of the invention, a head mounted device is provided comprising the processor system as defined above, wherein the head mounted device comprises the display system. The display system may be part of an HMD for rendering a virtual 3D environment, while showing in the real-view area part of the person wearing the HMD in the physical space. The HMD may report, as the tracking data, on its own axis and orientation, i.e. it has its own (0,0,0) point and orientation angle (usually, level + north direction as 0-axes). The tracking data may further include data from the HMD about its relative position and orientation in physical space.

In an embodiment, the head mounted device comprises a camera for providing camera data of the real environment, and the image processor is arranged to show said part of the real environment in the real-view area based on the camera data. Image data of a camera on or in the HMD may provide image data of the real environment, i.e. about the physical space. Advantageously, the user may see (part of) himself in the virtual environment via the real-view area at a realistic position and orientation, because the real-view area is positioned and oriented in the virtual environment according to the position of the HMD, i.e. the head of the person relative to the object(s) physical space which includes the user's own hands, legs etc., while the image data may be processed to determine the part and the scale corresponding to the pose of the head as detected via the HMD.

In an embodiment, the display system has a transparent part, and the image processor is configured to making visible said part of the real environment in the real-view area via the transparent part by not displaying image data in the real-view area. Advantageously, no processing is required for making visible the real environment in the real-view area.

It will be appreciated by those skilled in the art that two or more of the above-mentioned embodiments, implementations, and/or aspects of the invention may be combined in any way deemed useful.

Modifications and variations of the processor system, the devices, the server system, and/or the computer program, which correspond to the described modifications and variations of the method, and vice versa, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings, FIG. 13 shows a processing method for processing image data for rendering a virtual environment on a display system for a user, FIG. 14 shows a transitory or non-transitory computer-readable medium.

Figure 1:
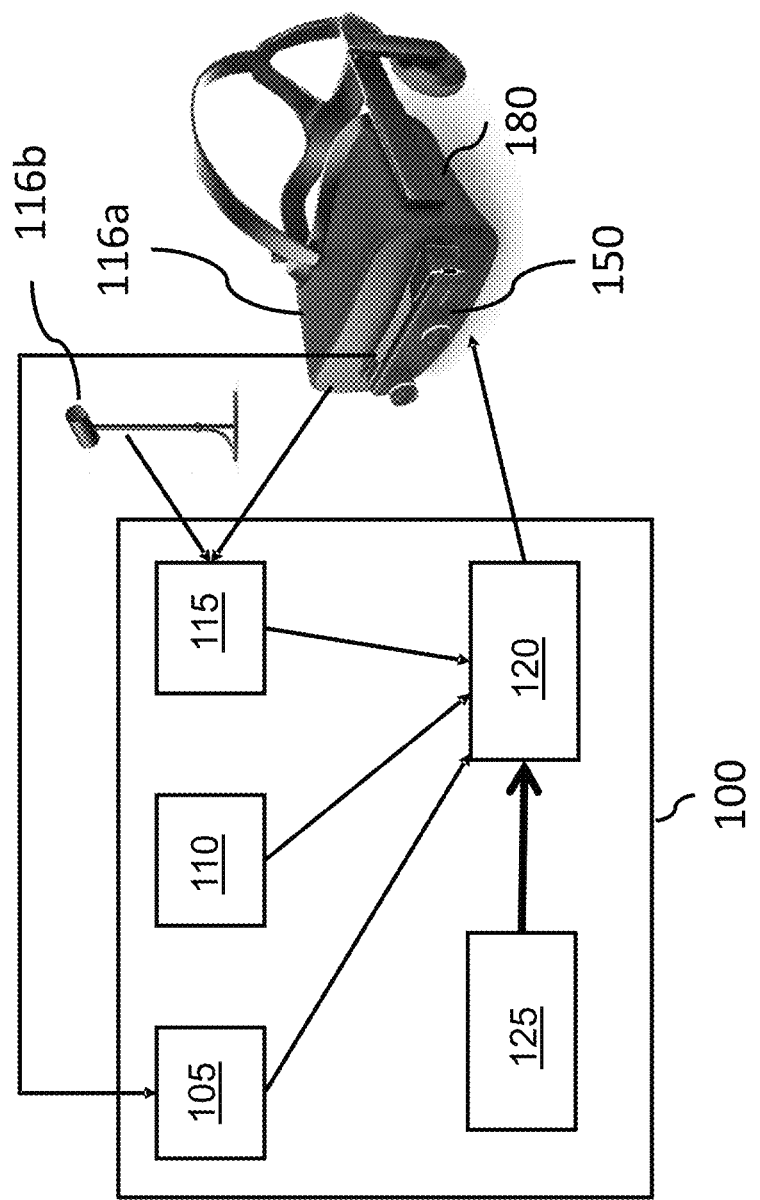
FIG. 1 shows an example of a processor system for processing image data for rendering a virtual environment on a display system.

It should be noted that similar items in different figures may have the same reference numbers, may have similar structural features, functions, or signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

AR augmented reality
AV augmented virtuality
ERP equirectangular projection
FoV field of view
HMD head mounted device
VR virtual reality
100 processor system
105 camera interface
110 virtual reality source
115 interface for receiving head tracking data
116a,b head tracking system
120 image processor
125 scene controller
150 camera
180 head mounted device (HMD)
300 display
305 real-view area
310 boundary
315 coordinate system
320 virtual environment
400 display
405 real-view area
410 left boundary
411 right boundary
415 coordinate system
420 virtual environment
500 head of a user
505 real environment object
510 sphere with projected virtual environment
520 image data plane for rendering real world
530 virtual environment
540 rectangular real-view area 620 local data plane
650 viewport
660 camera field of view (FoV)
670 small field of view
680 large field of view
700 real environment
710 real world object
720 virtual environment
730 real-view area
800 processing method
810 steps for making visible the real environment
900 computer readable medium
910 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

FIG. 1 shows an example of a processor system for processing image data for rendering a virtual environment on a display system. The virtual environment is to be rendered for a user, which user is present in a real environment. The Figure shows a processor system 100 having an image processor 120, which may also be called a rendering machine. The processor system has an interface 115 for receiving head tracking data from a head tracking system 116a, 116b. The head tracking system may be partly or fully integrated in a head mounted device 180, which may also contain the display system for displaying images for both eyes of the user. The head tracking data is indicative of at least the orientation of the head of the user in the real environment.

The processor system may further have a camera interface 105 to receive camera data from a camera 150. The camera may also be positioned on, or integrated in, the head mounted device 180. The processor system may further have a virtual reality (VR) source 110, which may be an interface to receive external virtual reality data or a local VR generating system. The processor system may further have a scene controller 125 to provide configuration data and settings for controlling the images that are displayed for the user.

The image processor is configured to generate image data for rendering a viewport of the virtual environment on the display system. The viewport is the part of the virtual environment that is displayed to the user on the display system, and is thus dependent on the user's head orientation. The viewport is generated based on the head tracking data. The image processor is further configured to define at least one real-view area in the virtual environment, and to determine at least one boundary of the real-view area. The boundary corresponds to predetermined coordinates in the virtual environment. The system is arranged for making visible a corresponding part of the real environment in the real-view area. The part shows the real environment as perceived from the user head pose, i.e. how the user would see the real environment in this part of his field of view, giving his head pose.

In a practical embodiment, the VR source provides a VR service representing the virtual environment, for example a 360-video showing a movie, a game environment, a windows or desktop environment, a social VR environment, a VR video conference environment etc. The VR service is consumed on a HMD or VR headset, i.e. displayed on a built-in display for the eyes of the user. The VR headset may have a camera mounted on the front, or a built-in camera. Optionally, the camera is a stereo camera, i.e. offering a view for each one of the eyes. To generate tracking data regarding the pose of the head of the user, the position and orientation of the HMD is tracked, either by an internal tracking system (i.e. inside-out tracking) or by one or more external sensors (i.e. outside-in tracking) or both. The output of the camera is captured and transferred to the processor system via the camera interface. The combination of the VR service and the camera images is to be rendered together for display on the HMD. The combination may be controlled by the scene controller, e.g. a WebVR based environment or a Unity project. The scene controller may be integrated within the VR service. The scene controller may provide a configuration that defines the real-view area. The configuration may define coordinates in a coordinate system of the virtual environment, e.g. horizontal and vertical angles, for which to show the camera data.

Effectively, the above processor system defines one or more real-view areas in the virtual environment, which areas are either transparent or show camera data as perceived from the user head pose. The real-view area(s) may not show any virtual objects. The real-view areas are defined using a coordinate system of the virtual environment, e.g. in horizontal degrees and/or vertical degrees compared to the 0-axis of the virtual environment. For moving users, the coordinates may also include position, e.g. tracked based on the position of a HMD, i.e. taking into account head translation on the 3 axes of a 3D coordinate system.

A camera may capture the view of the user on the real environment, i.e. as perceived from the head pose that defines the position of the user's eyes. For example, the head pose of the user wearing the HMD may be tracked, while a front-facing camera may be mounted on the HMD. Optionally a stereo camera or a color+depth camera is used and mounted on the HMD.

In the image processing a plane may be defined in the virtual environment, e.g. projected behind the virtual environment and visible where there are said real-view areas, e.g. by 'gaps' in the virtual environment. The plane is straight in front of the user, i.e. it fills the users view if no virtual environment is rendered, and moves with head rotations/translations. Alternatively, a local plane may be created only on the position of the real-view area where the camera capture should be shown. The camera image is rendered to the extent it overlaps with this plane. Optionally, the camera data may be scaled so that the size of the video matches the vision of the user, i.e. shows the real environment as perceived from the head pose. Subsequently, the camera image is displayed on the plane. The camera image is only rendered to the extent the real-view area in the virtual environment is present in the user's current viewport.

A VR environment may have a fixed axis system, in which (0, 0, 0) is the starting viewing position of the user, i.e. the 'virtual camera' position through which the user sees the environment. The north point is defined as the 0-degree forward point on the horizontal plane, as the starting viewing orientation. Together (position and orientation) they define the axis system for a VR service. The orientation can be either defined as the yaw, pitch and roll (illustrated in FIG. 2b) or as a vector pointing from the origin towards some point (illustrated in FIG. 2a). When the user rotates his/her head, the HMD orientation will be updated along these axes. A more versatile tracking system may also track movements. When the user moves his/her head, e.g. by standing up or walking, the HMD position will be updated along these axes.

Figure 2B:
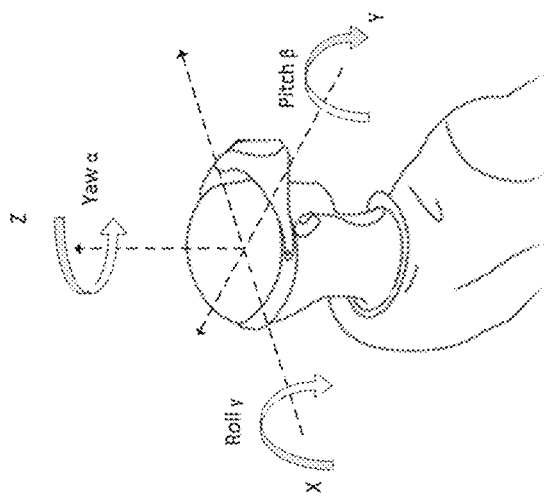
FIG. 2b shows a coordinate system with roll. If a camera is placed level, roll need not be defined.
Figure 2A:
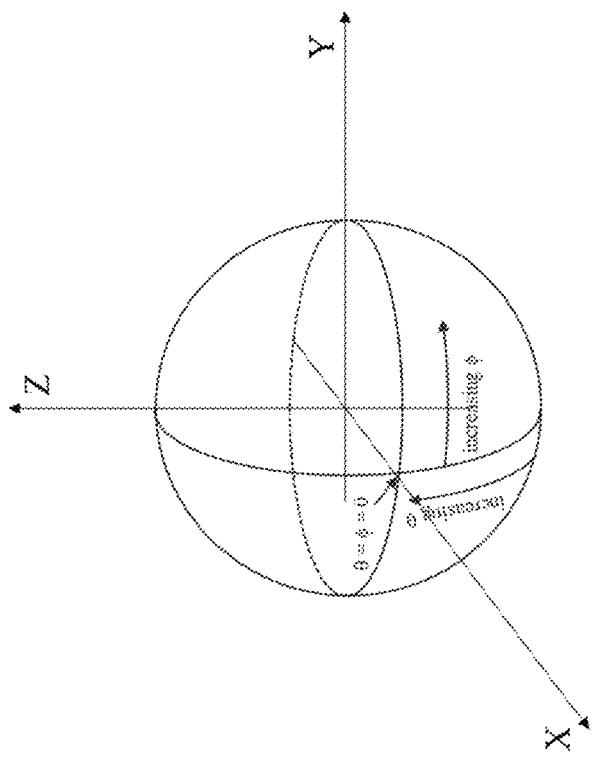
FIG. 2a shows a coordinate system without roll.
Figure 4:
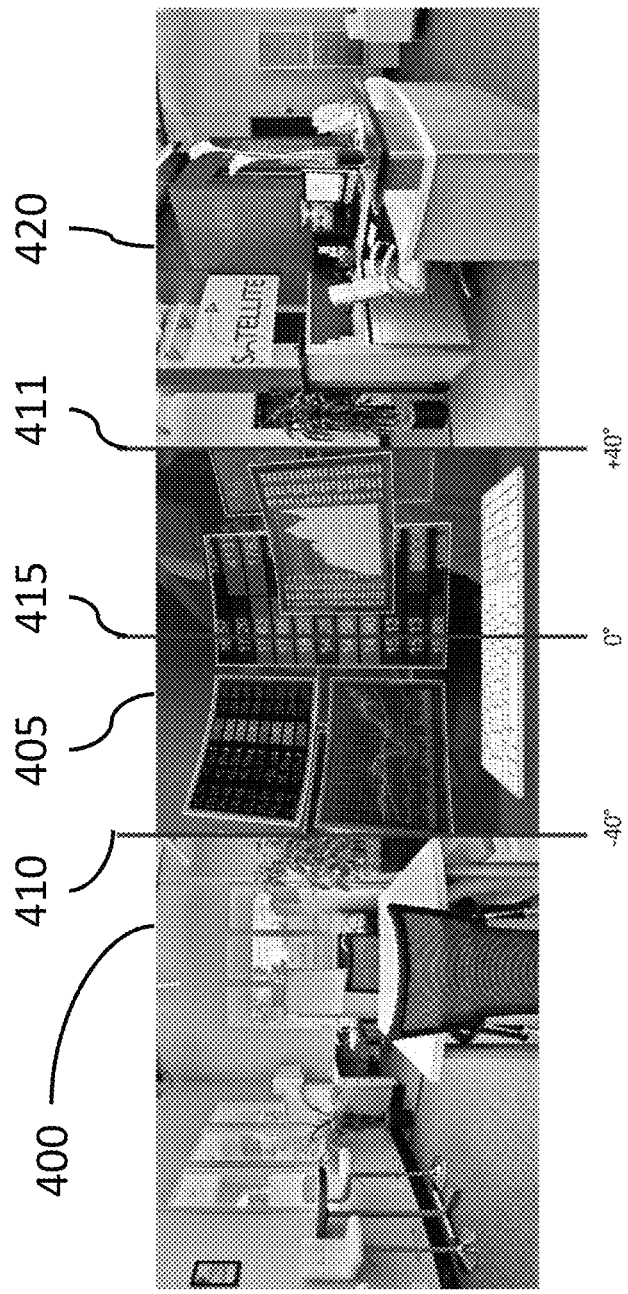
FIG. 4 shows an example of a display showing a virtual environment and a vertical real-view area.

FIG. 2a shows a coordinate system without roll. FIG. 2b shows a coordinate system with roll. If a camera is placed level, roll need not be defined. Using a coordinate system as shown in FIG. 4, a position may be defined as (x,y,z)=(0,0,0) and its orientation may be defined as (yaw, pitch, roll)=(0, 0,0), or as a vector with position as origin (x,y,z)=(1,0,0). The coordinates may be measured in the metric system, or in selected units.

Figure 3:
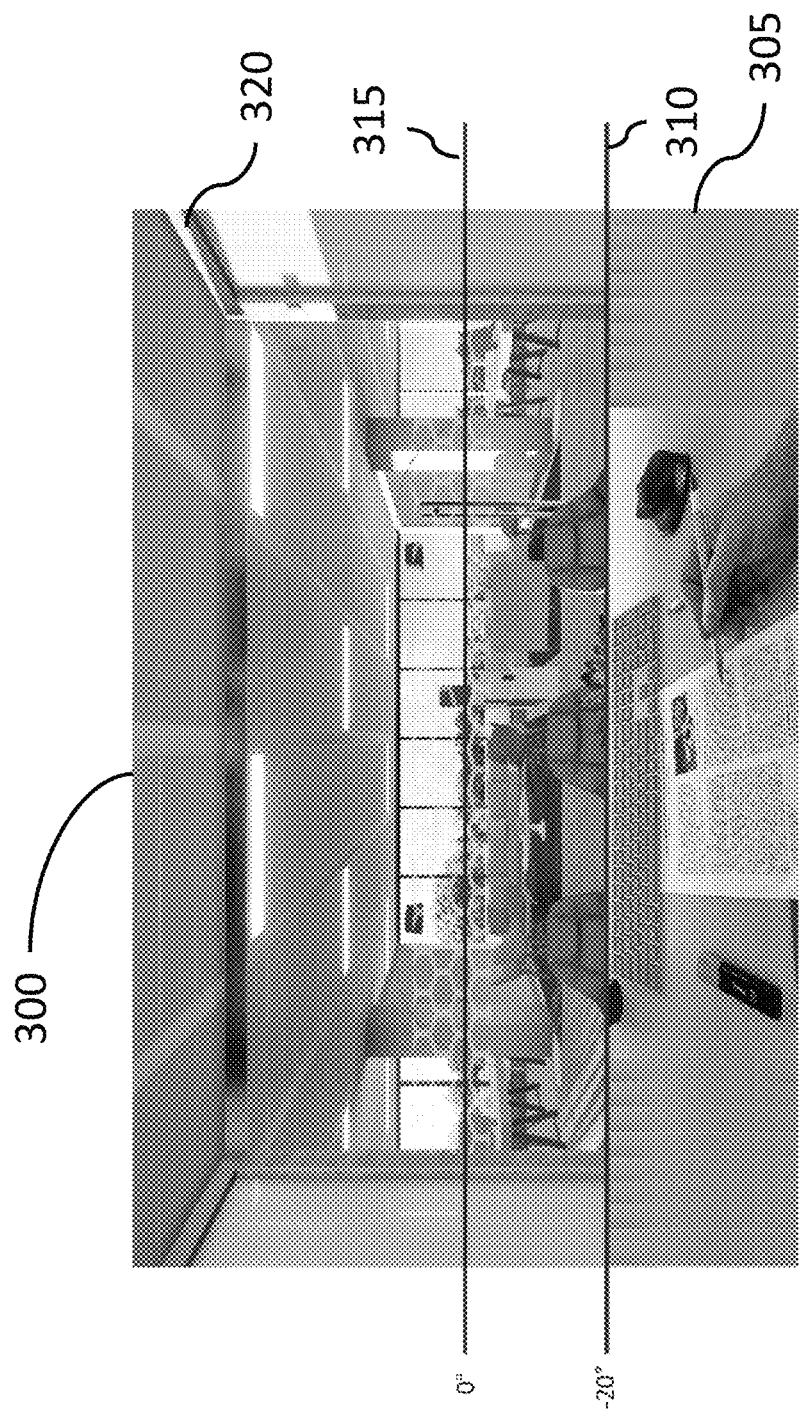
FIG. 3 shows an example of a display showing a virtual environment and a horizontal real-view area.

FIG. 3 shows an example of a display showing a virtual environment and a horizontal real-view area. A display 300 shows an example of augmented virtual reality. The upper part of the display shows a virtual environment 320, e.g. an office room having multiple working spaces. The lower part of the display constitutes a real-view area 305, e.g. showing a desktop and a hand of the user. A boundary 310 separates the real-view area and the virtual environment. The boundary is located at predetermined coordinates in a coordinate system 315 of the virtual environment, schematically indicated by a horizontal line at 0 degrees. The boundary has a fixed position of a horizontal line at −20 degrees. The display may represent the viewport of a user looking straight forward. When, for example, the user pitches his head forward as indicated by the tracking data, the viewport will be adapted and a larger part of the real-view area becomes visible in the user's viewport, as the 0 degrees level is now higher in the viewport by the amount of head pitch.

FIG. 4 shows an example of a display showing a virtual environment and a vertical real-view area. A display 400 shows an example of augmented virtual reality. The leftmost and rightmost parts of the display show a virtual environment 420, e.g. an office room having multiple working spaces. The middle part of the display constitutes a real-view area 405, e.g. showing operational panels. A left boundary 410 and a right boundary 411 separate the real-view area and the virtual environment. The vertical boundary lines are located at predetermined coordinates in a coordinate system 415 of the virtual environment, schematically indicated by a vertical line at 0 degrees. The boundaries have fixed positions at −40 degrees and +40 degrees. The display may represent the viewport of a user looking straight forward. When, for example, the user yaws his head to the left as indicated by the tracking data, the viewport will be adapted and the real-view window will shift to the right in the viewport, as the 0 degrees line has now moved to the right in the viewport by the amount of head yaw. In a similar example the middle part may be the virtual environment showing virtual operational panels, while the user can see much of his physical surroundings to both sides of the virtual panels in two real-view areas.

In an embodiment, a plane may be created that shows the camera image needed for the real-view area. Such plane may have certain properties: it may be fixed, i.e. either moving or not moving along with user's head movement, regarding position and orientation, which properties can be updated on events or continuously based on the tracking data. By defining a plane that is fixed in relation to the users view, i.e. always in front, it allows rendering camera data as provided by a camera mounted on a HMD. Furthermore, either 'cutting a hole' in the VR scene, i.e. leaving out parts of the VR scene, or by defining transparency in a certain part of the VR environment, allows the plane that is rendering the camera image to become visible there. For example, such plane is convenient for 360-degree experiences, e.g. using 360-degree photos or video. Cutting a hole in a picture or video, i.e. by leaving out pixels in a certain area, effectively creates the real-view area.

Figure 5:
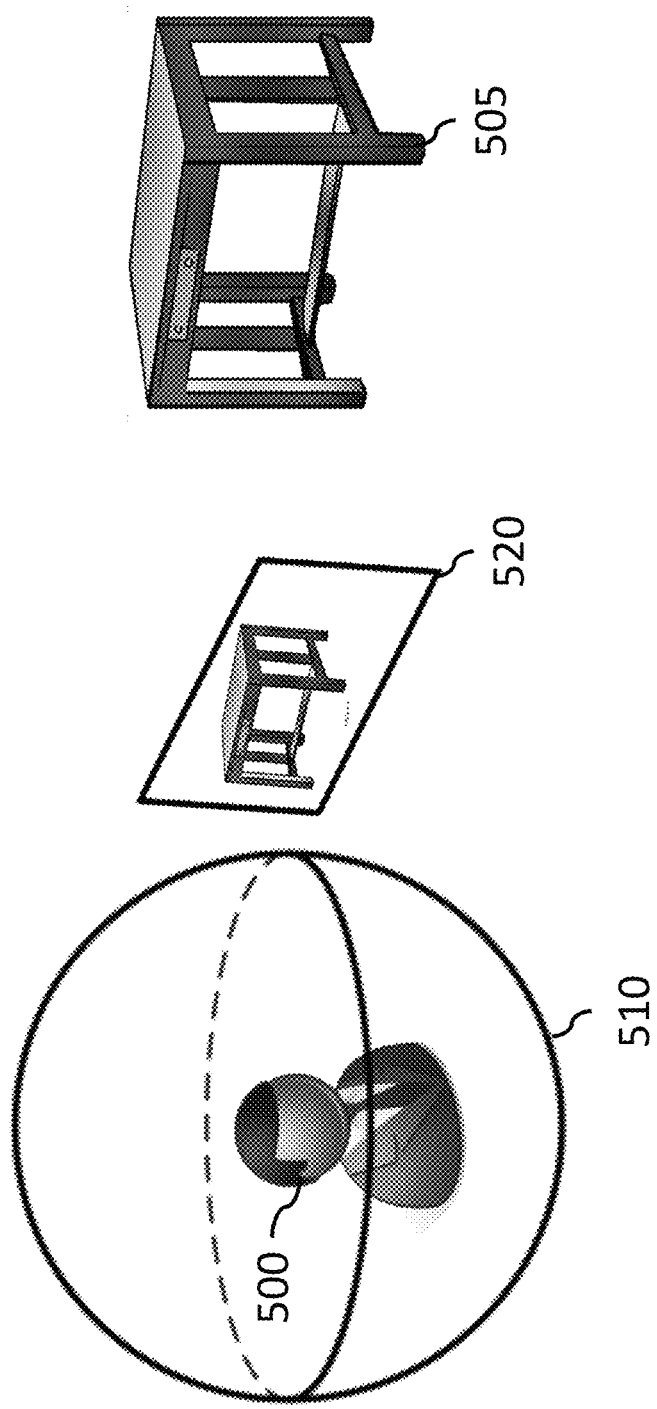
FIG. 5 shows an example of an image plane in a rendering system.

FIG. 5 shows an example of an image plane in a rendering system. The Figure shows a head of a user 500 in a display system (not shown as such). The display system is provided with display data that is generated using a sphere 510 which is used to project the virtual environment. The real environment object is schematically indicated by a real-world object 505, e.g. a desk. An image data plane 520 is created for rendering the real world, illustrated by showing the object on the plane. The Figure illustrates using the plane 520 behind the projection of the virtual environment, which plane moves with the tracked orientation of the head. If a virtual environment consists of a 360 image or video, this environment may be projected on a sphere 510 around the user 500. The figure shows the user looking from the inside of the sphere towards the sphere. In this case, the real environment shows a desk, which can be recorded with a camera, e.g. a camera mounted on the user's VR HMD. FIG. 5 also shows the plane, which is used to display the camera image. The plane 520 is fixed in relation to the user's orientation: if the user will rotate his head, the plane will remain right in front of the user.

As the image plane showing the camera image is rendered behind the projection of the virtual environment on the sphere, the camera image would not be visible to the user. Creating the real-view area is executed by removing part of the virtual environment, so that the camera image will be visible to the user while the image plane shows that specific part of the real environment. Removing a part can be done in various ways, either by actually removing a part, or by making a part transparent, or by preventing the rendering of a part. The removed part of the virtual environment creates the real-view area, which in this embodiment is the area in the virtual environment where the image plane is visible to the user.

Figure 6:
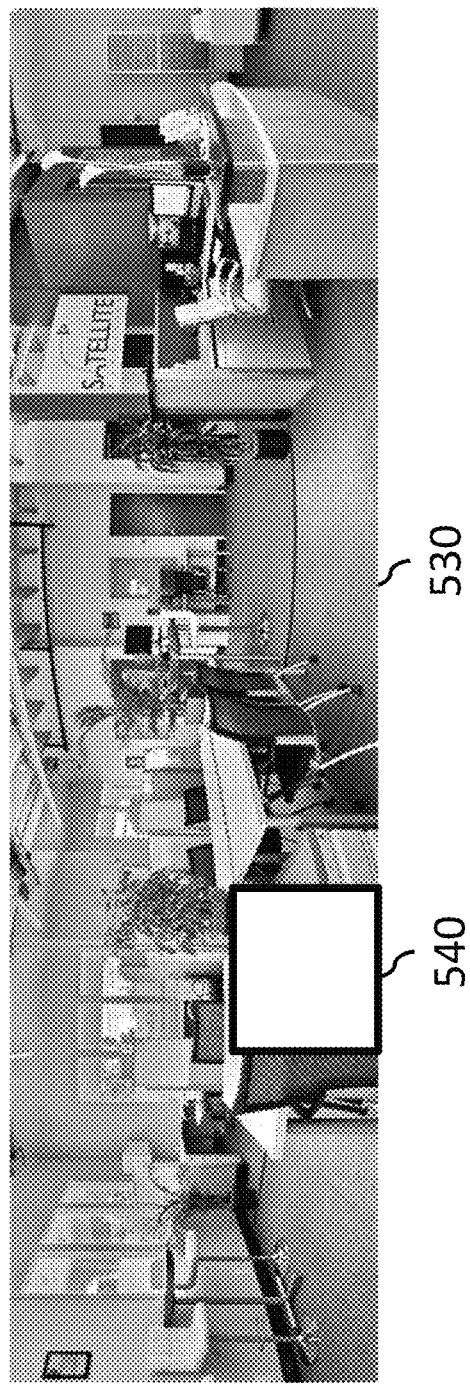
FIG. 6 shows an example of rendering a virtual environment having a real-view area.

FIG. 6 shows an example of rendering a virtual environment having a real-view area. The Figure provides an example for the rendering system discussed with FIG. 5 using an image plane behind a sphere. The sphere is for displaying the virtual environment, while the plane is for displaying the real environment. FIG. 6 shows a rectangular real-view area 540 surrounded by three boundaries (left, top, right), while the vertical boundaries actually come together at the bottom when display data is generated to be projected on a sphere. The real-view area may be created by 'cutting a hole' in the sphere, as the image plane behind the hole shows the real environment.

The virtual environment 530 shows an equirectangular projection (ERP) of a 360-degree image, e.g. a photo of an office environment, or perhaps one frame of a video of an office environment. This projection can be projected on a sphere to give a proper virtual environment to a user. The virtual environment data may not cover the full sphere, e.g. a bottom part or top part may be missing effectively giving the virtual environment a lower limit and/or an upper limit, as shown in FIG. 6. In the image, the part 540 has been removed. In this case, one horizontal boundary and two vertical boundaries have been defined, together defining an area where the image data of the 360-degree image has been removed, i.e. cut out. The lower boundary of the real-view area coincides with the lower limit of the virtual environment. When such image data is rendered to the user, the image data plane showing the camera data as shown in FIG. 5 will be visible, as it is behind the cut-out part in the 360 image. So, the user can see the camera data of the real world, but only in a part, i.e. the real-view area, as defined by the boundaries.

Figure 7:
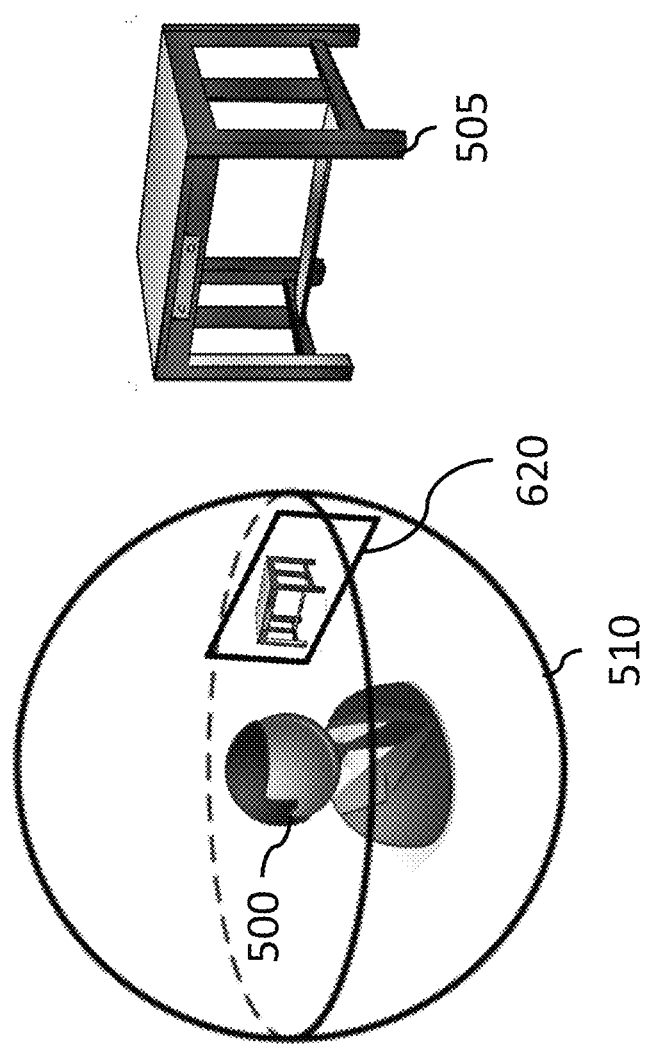
FIG. 7 shows an example of a local plane in a rendering system.

FIG. 7 shows an example of a local plane in a rendering system. The Figure shows a head of a user 500 in a display system (not shown as such). The display system is provided with display data that is generated using a sphere 510 which is used to project the virtual environment. The real environment object is schematically indicated by a real-world object 505, e.g. a desk. A local data plane 620 is created for rendering the real world, illustrated by showing the object on the plane. The Figure illustrates using the plane 620 in front of the projection of the virtual environment, which local plane moves together with the viewport. If a virtual environment consists of a 360 image or video, this environment may be projected on a sphere 510 around the user 500. The figure shows the user looking from the inside of the sphere towards the sphere. In this case, the real environment shows a desk, which can be recorded with a camera, e.g. a camera mounted on the user's VR HMD. FIG. 7 also shows the local plane, which is used to display the camera image. The plane 620 is fixed in relation to the coordinate system of the virtual environment: if the user will rotate his head, the plane will move with the virtual environment.

In the embodiment of FIG. 7, the camera image data is only displayed to the user when the user is looking in the direction of (or near) the local plane, as shown in FIG. 7. In this case, the plane showing the camera image data is positioned on the inside of the sphere on which the virtual environment is projected. So, if the user is looking in the direction of this plane, he will see the camera image data, e.g. as captured by a camera mounted on the HMD. Thereto the camera image data is rendered only to the extent that it overlaps with the local plane. If then the user looks to the other side, the plane will not be showing anything, as no part of it is overlapping with the camera capture. Note that this may mean that the left part of the camera image data is shown on the right side of the real-view area, if only this right side of the real-view area is inside the viewport. Only when the real-view area is completely within the viewport, will the entire camera image data be shown (of course depending on the camera field of view, as explained in relation to FIG. 8.

This rendering may be done by determining the overlap, cropping the camera data, e.g. the current video frame, and rendering the remaining data on the part of the rendering plane that is overlapping the captured frame. Alternatively, this rendering may be done by determining the non-overlapping part in the captured frame, and making this part fully transparent. This rendering does not require the real-view plane to be a rendering frame: no actual data is rendered on this plane. Similar to the example in FIG. 5, a plane is defined fixed in front of the user, but now on the inside of the sphere. Instead of creating a 'hole' in the virtual environment, transparency of the (part of) the plane rendering the captured camera images is used to make it invisible where real-view data is not required.

Figure 8:
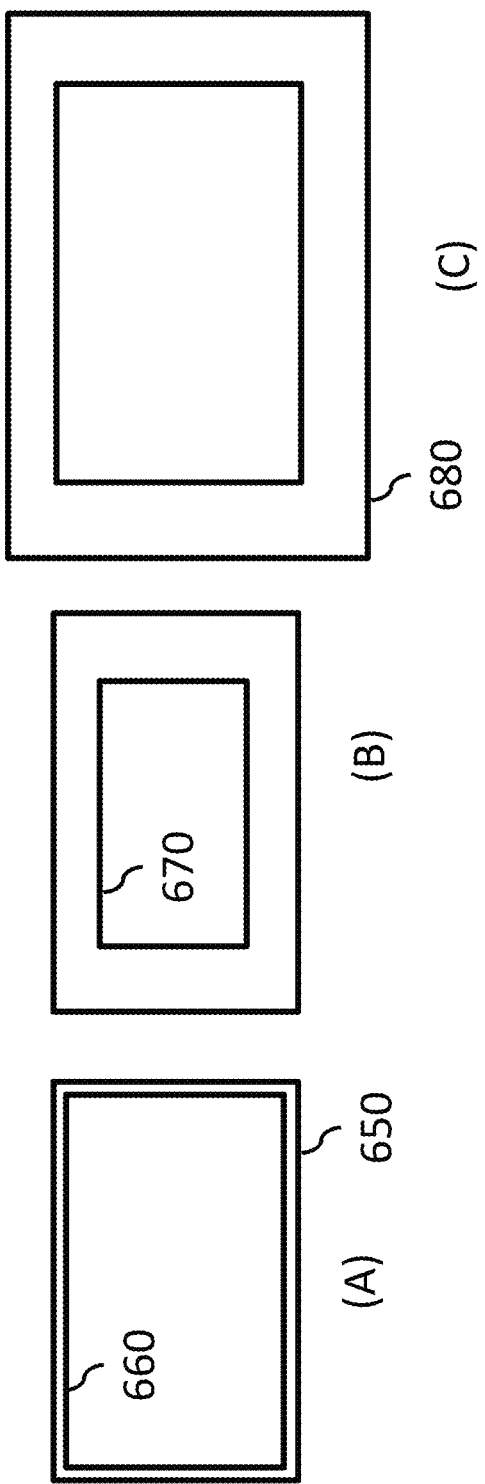
FIG. 8 shows three scenarios for the HMD user viewport and the camera field of view.

FIG. 8 shows three scenarios for the HMD user viewport and the camera field of view (FoV). As shown in scenario A, the FoV 660 of the camera is as large as the viewport 650 offered by the HMD. Any part of the real world that should be visible in the viewport, i.e. part of the real-view area, will be recorded by the camera and can thus be displayed to the user.

A second camera FoV 670 is smaller than the viewport offered by the HMD, as shown in scenario B. This may limit the experience a user will have with the system. Only the part of the real-view area, as captured by the camera system, can be displayed, as only for that part, image data will be available. Still, as the camera is normally centered around the center of the user's viewport, this may be quite usable, as only part of the periphery is lost. Optionally, to compensate for parts of the real-view area for which there is no camera data, the virtual environment may be shown in the empty parts of the real-view area, i.e. effectively shrinking the real-view area based on the camera FoV.

A third camera FoV 680 is larger than the viewport offered by the HMD, as shown in scenario C. This may result in a good experience in the sense of real-view area that can be shown. All parts of the real-view area can be covered, similar to the situation shown in scenario A. But, this will lead to some inefficiencies, as some areas get captured by the camera and are not used for display. The camera image data as captured may be cropped to limit the camera image data to the current viewport, to increase efficiency.

In an embodiment, the camera may be shut down when the real-view area is not in the viewport of the user. So, required processing power and supply power may be further reduced.

Figure 9:
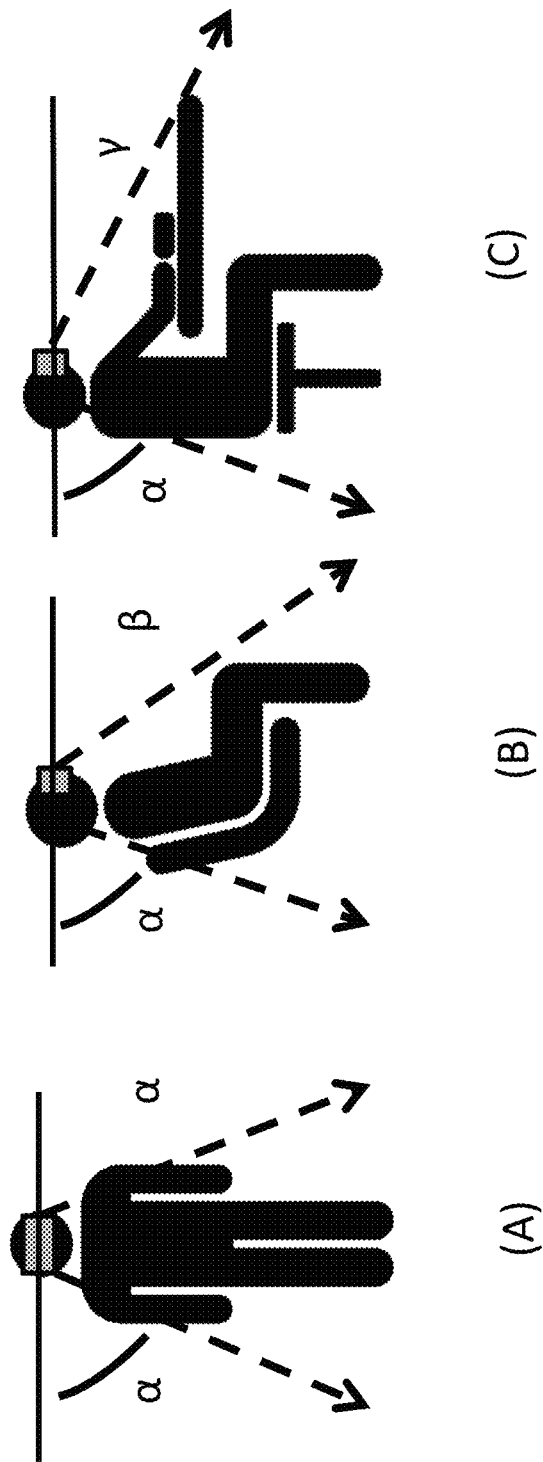
FIG. 9 shows a user with respect to the real environment.

FIG. 9 shows a user with respect to the real environment. The real-view area is not just at a random location in the real world, it should offer a view to a part of the real world that is intended to be part of the experience. FIG. 9 shows some examples of this for horizontal boundaries. For a horizontal boundary, the real view area may be dependent on the user position, e.g. sitting vs standing, and on what the user is expected to be doing. If it is meant to mainly offer a view of the user's own body, i.e. for reasons of immersion and embodiment (feeling as if you are really there, in the virtual environment), then only a small area downward is needed, e.g. a boundary at −70 degrees, as shown in scenario A, the angle depicted as a, in this case for a standing user If a person is sitting, the front of the user may be larger than the back, extension-wise, as shown in scenario B. So, while a back boundary may remain e.g. at −70 degrees, the front boundary should be higher, i.e. a lower degree from the horizon such as −60 degrees, depicted as β.

If a person is sitting at a desk, with their arms in front to e.g. handle a mouse and keyboard, the horizontal boundary may be even higher. This is depicted in scenario C. In such a case, the angle may e.g. be −40 degrees, depicted by γ.

If different horizontal boundaries for front and back are defined, there may be a combination of vertical and horizontal boundaries at the sides of the user. And, various boundaries may change if the person changes his/her position. For example, if the user stands up, the boundary coordinates, e.g. in degrees, may change with your movement taking into account the user's position, e.g. a relevant part of a desk may be further down in degrees compared to sitting.

For vertical boundaries, degrees may be configured from a North or straight in front position. Such position may be calibrated for a headset, e.g. for seated VR this may be the direction straight in front of the PC, e.g. sitting straight at your desk. The degrees can be either expressed in positive degrees or both positive and negative degrees. E.g. a boundary at 45 degrees on each side of 0 degrees (North) can be referenced as 45 and 315 degrees or as +45 and −45 degrees.

Figure 10:
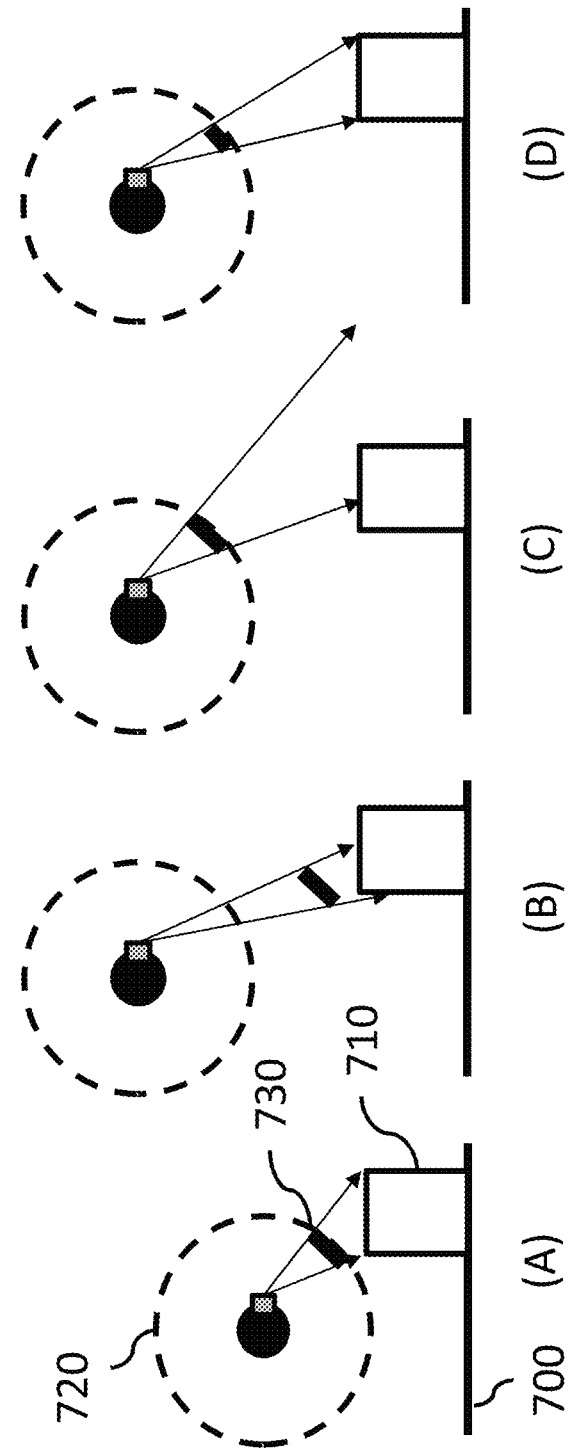
FIG. 10 shows four examples of a side view of a user in a virtual environment.

FIG. 10 shows four examples of a side view of a user in a virtual environment. A real environment 700 has a floor and an object 710, e.g. a table. The first example, marked (A), shows a real-view area 730 that is aligned with the table. In this example, there are 2 horizontal boundaries defined at predefined angles, together defining the real-view area. A user is shown wearing a HMD in a virtual environment (VE), shown on a dashed sphere.

The virtual environment may be a 360-degree photo or video. In this case, normally a static sphere is defined around the user, at a certain distance. As a 360 video is recorded from a single point, head translations do not have any influence on what a user sees. The virtual environment may also be a 3D environment, i.e. a graphical 'game-like' environment. In this case, the user is inside a virtual 3D world, and head translations will have effect. E.g. the user would be able to look behind a wall. The virtual environment has a coordinate system. Normally, when the user enters VR, he will be defined as the center, i.e. the (0, 0, 0) point, looking around in the virtual environment through a so-called virtual camera. This camera can either move around based on head tracking, e.g. in the 3D environment, or be statically placed, i.e. in case of a 360 photo or video. In both cases, the orientation, i.e. the direction the virtual camera is aimed at, will be updated based on the head rotations of the user, as detected by the HMD tracker. Also, the real environment has a real-world coordinate system, i.e. the usual physical world.

There are at least 3 different embodiments of mode of operation of controlling the real-view area, as elucidated with examples B, C and D. The examples show, what may happen when the user, wearing the HMD, is standing up.

In example (B) of a standing user, the real-view area stays at the same position in the virtual environment. This could may be happening if the user is in a 3D environment, and the user sees the real world through a specific part of the 3D environment, e.g. a dedicated area placed inside the virtual environment. The user will see a different part of the real-world, depending on the position of the user's viewpoint. This is similar to looking out a physical window, the user may change his head position to look at different parts outside. The 3D virtual environment may behave similar to a physical environment, i.e. rotating a user's head 360 degrees brings the user back to the same point, and moving his head 1 meter upwards takes you 1 meter upwards in the virtual environment also. If this is the case, example (B) is similar to having the real-view area having a fixed position in the real-world coordinate system. There are still some further design choices that e.g. if there is a virtual wall, moving around the virtual wall may lead to the real-view area no longer being visible, or the real-view area could always be visible no matter what. This scenario may also be used with 360 photo or video content as virtual environment.

In example (C) of a standing user, the real-view area remains at the same directional coordinates in the VE coordinate system, relative the user's HMD position. This may be used when the virtual environment is a 360 photo or video, where the user is not expected to move much. The virtual environment may have e.g. a virtual desk position, which is situated at the real-view area. If the user slightly moves his or her head, he would see a slightly different part of the real world as well. As shown, when standing up, he would see a slightly different part of the table, and look over it for a part.

In example (D) of a standing user, the real-view area is adjusted based on the position of the user's head, so that the user will have the same part of the real world in view through the real-view area, even during head translations such as standing up. This may be done, if the distance towards the real-world objects can be estimated or measured, as the adjustment for objects at a large distance is different from adjustment for objects close by. For example, the user HMD may contain a stereo camera looking outwards, and the stereo images may be used to estimate this distance.

The above embodiments may be arranged to perform similar for head position movement in the horizontal direction, or for diagonal (i.e. horizontal and vertical) head position movement.

Figure 11B:
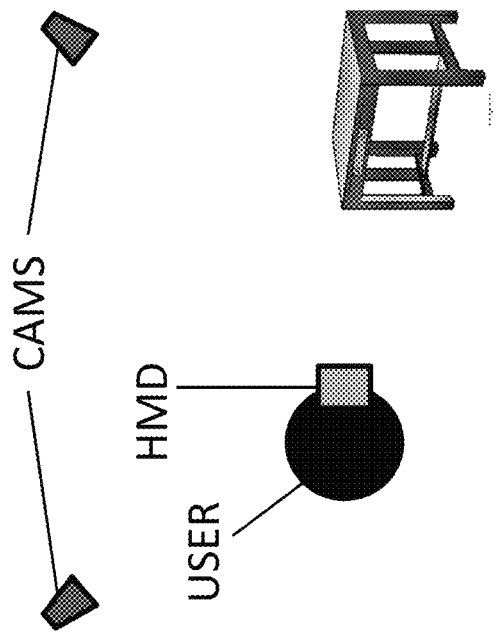
FIGS. 11a and 11b show two different camera systems.
Figure 11A:
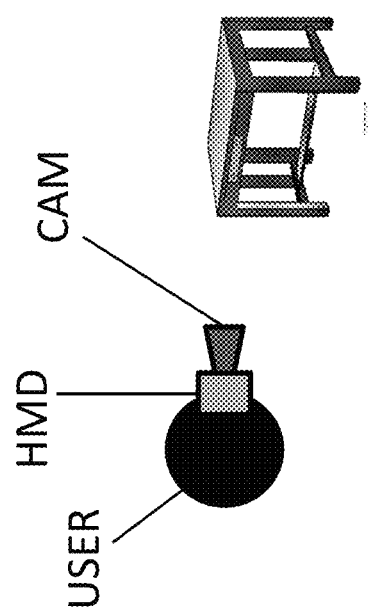

FIGS. 11a and 11b show two different camera systems. For the camera data, a capture of the part of the physical environment is to be performed, which shows the real environment as from the viewpoint of the user.

A first embodiment of a camera system is shown in FIG. 11A, where a camera CAM is attached to or included in the HMD of the user. This may be a stereo camera, specifically meant for this purpose, such as a ZED mini stereo camera. The effect of a stereo camera, which reflects the viewpoint of the user, is that each side of the camera captures the view for the respective one of the user's eyes, and may be displayed for this purpose, optionally after some transformation e.g. to correct for the difference in position between camera lens and user's eye placement Another camera system may be combining one or more regular (RGB/color) cameras with one or more depth cameras, as often encountered in AR headsets such as the HoloLens or the Magic Leap headset. By combining at least one color and one depth camera, a 3D view of the viewpoint of the user can be captured for playback in the real-view area. Optionally, there is only a single camera, and a mono stream of camera data is then supplied to each of the user's eyes, possibly after some transformations to make the recording more suitable for each eye. Downside of both the RGB+depth or the mono data, is that any image transformations may be required which introduce additional delay.

FIG. 11b shows another camera system which may generate camera data from the viewpoint. In the physical environment of the user, there may be multiple cameras CAMS present that can be used for capturing the environment. These may be cameras specifically deployed for capturing the environment and creating a 3D image reconstruction. They may e.g. be placed strategically as to effect the capture of most if not all of the immediate environment, e.g. in a room. By creating a 3D video reconstruction of the environment, this allows to place a virtual camera view anywhere in the environment, i.e. what is called free-viewpoint video. The cameras may be fixed cameras mounted in the real environment, or dynamically selected, positioned or combined cameras, e.g. using the cameras of various devices such as smartphones or tablets for this purpose. Advantage of the latter scenario, is that this will not require any camera attached to or included in the HMD of the user. Downside is that it may require additional effort (and thus potentially delay) to process the captured images, to determine the viewpoint of the user based on the head tracking, to align the camera coordinate system with that of the HMD, and to transmit the image(s) (either before or after determining the user's viewpoint) to the user's device for display.

In an embodiment the display system has a partly transparent display. For example, see-through augmented reality (AR) headsets are headsets that use some kind of projection method to allow the user to both see the real world through a transparent part of the headset, while allowing overlays to be shown within this transparent part. Typical examples are the Microsoft HoloLens, the Magic Leap 1 and the Meta 2. Current AR glasses are still limited in their field of view, i.e. typically being somewhere around 45 degrees horizontally (HoloLens 2, Magic Leap) while the Meta 2 offers a higher field of view of around 90 degrees horizontal. Expectancy is this will increase in the future, and this would allow using an AR headset also as a VR headset, if the images can fill the entire user's view.

In an embodiment the above processor system that provides a real-view area is be applied to AR headsets. The processor system is similar to VR headsets but adapted as follows. While the virtual environment is similarly projected, no images are needed for display in the real-view area. As long as nothing virtual is projected in the real-view area, this area will automatically offer a view of the physical world. Big advantage of this embodiment, is that the latency of the real-world view is 0, as there is a direct view through a transparent part of the display.

Optionally an AR headset may also be used in exactly the same way as a VR headset by using a camera for capturing the real-world environment and using the projection/display capabilities of the AR headset to display this part in a real-view area of the headset.

Figure 12:
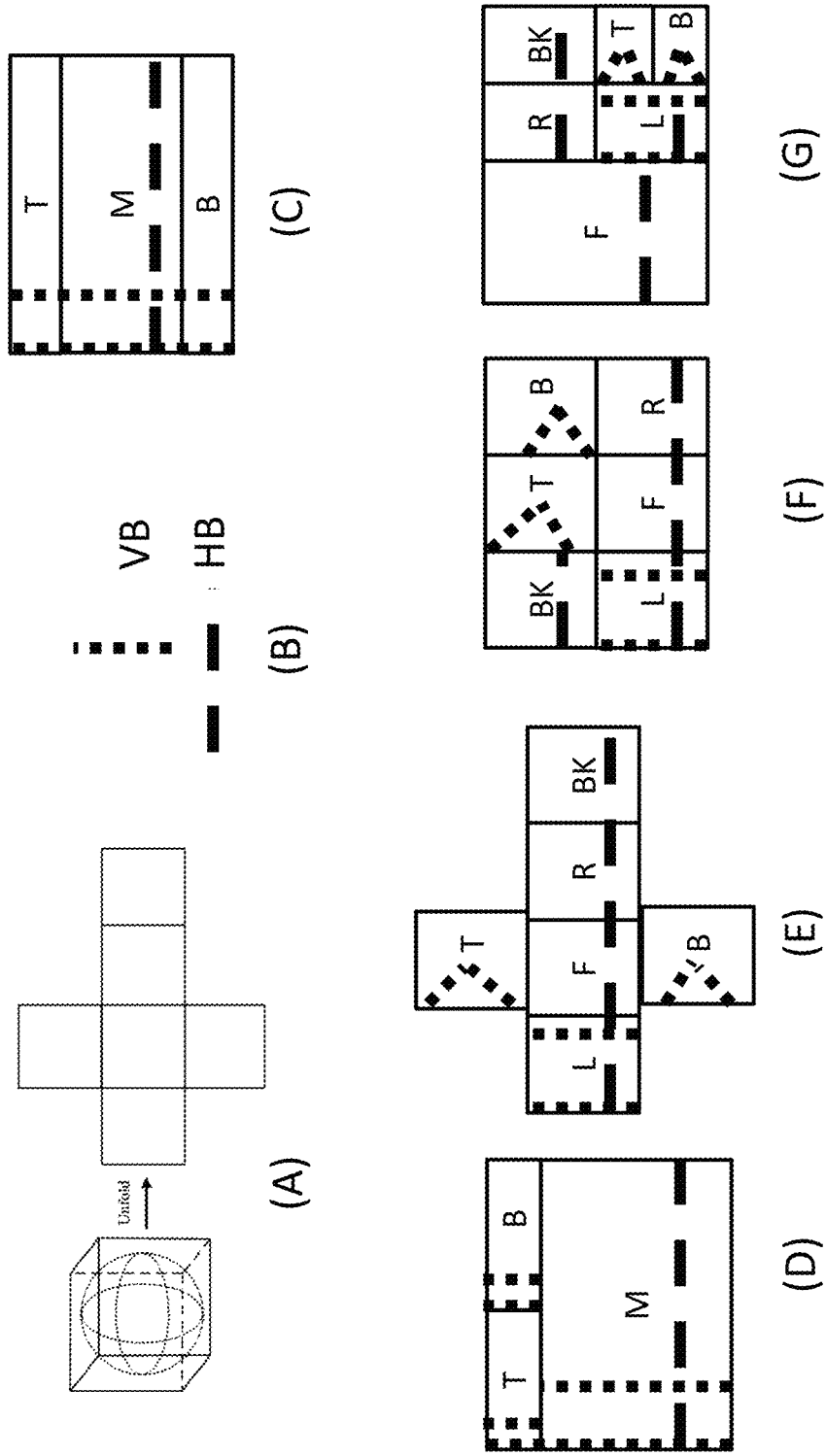
FIG. 12 shows defining boundaries in various projections.

FIG. 12 shows defining boundaries in various projections. The boundaries define a real-view area in a 360-degree image (photo) or a 360-degree video (sequence of 360-degree images/frames) by making the area transparent. Various projection methods may be chosen for projecting the 360-degree image from a sphere on an encodable flat surface. Two example methods for this are the equirectangular projection (short: ERP), well-known from any earth map, and the cube map projection. In the second projection method, the 360-degree sphere is placed inside a cube, and the image is projected on the cube, which can then be unfolded as shown in section (A).

Section (B) shows the legend for the rest of the figure, showing a horizontal boundary HB and a vertical boundary VB, using two different styles of dashes. In the Figure, parts of each projection may be marked as follows: F=front, T=top, B=bottom, L=left, R=right, M=middle, BK=back, FIG. 12 section (C) shows a regular ERP, where all boundaries are easily drawn in the projection: 2 vertical boundaries at roughly −180 degrees and −120 degrees (North or 0 degrees being the center of the image), and one horizontal boundary at roughly −30 degrees (horizon as 0 degrees and below as minus range). As the top part and bottom all comes together at the north- and south 'pole', the boundaries may all be drawn straight.

Section (D) shows a different packing projection, which may be called ERP with region-wise packing. Here boundaries may be drawn straight, but as less space (i.e. pixels) is used for top and bottom, they require separate boundaries, and they shift compared to scenario (C) as their width is only half of the width of the middle part.

Section (E) shows cube map projection. For cube map projection, the boundaries are more complex. For the basic cube map projection, as long as the horizontal boundary goes through the front, it can be drawn easily. If it would have been in the top or bottom, it would have become a circle inside that cube face. For the vertical boundaries, the center points of the 360 sphere are the center points of the top and bottom face. So here the vertical boundaries in the top and bottom part go towards these center points, and there they end, as shown in section (E).

Section (F) shows a region-wise packing projection to organize faces. Packing the faces as shown here will not change the boundaries, but it will look a bit different due to the different organization.

Finally, section (G) shows a region-wise packing projection to organize faces having a higher quality front. Here the top and bottom part receive less vertical resolution, thus the center point shifts and thus the boundaries also change.

Defining the real-view areas in such a projection can be used to cause part of the projection to be transparent, by either not supplying any image data for these parts, by using the alpha-channel to define transparency for these parts, by using a chroma color and later using chroma keying to remove the part during rendering, etc.

The cut-off between the virtual environment and the real-view area may be strict on the boundary itself. In an embodiment, for a good immersive experience, additional measures may be taken to cause a smooth transition between the virtual environment and the real-view area. The measures may consist of a blending of parts of the virtual environment and the view of the real environment, by e.g. defining an area where the pixels are a mix of pixels from the virtual environment and the real environment, for example using a (small) area for the transition of 100% virtual environment to 100% real view. This can also be seen as a transition in transparency of either the virtual environment or the real view, also with a transition of 0% transparency to 100% transparency. Other methods may comprise image transformations to smooth the edges, e.g. by blurring, feathering, smoothing, etc. the boundary, or by introducing an additional element that 'covers' the edge, e.g. adding a kind of mist or cloud or discoloring at the boundary between the view of the virtual and the real environment.

A number of examples explain the projection of a virtual environment on a sphere, as is normally done for 360-degree photos or videos. If the virtual environment is a graphical 3D environment or a point-cloud or mesh-based 3D environment, the step of projection on a sphere is normally not performed. Instead, during rendering, the 3D environment is rendered based on the user's head pose directly. The step of cutting a hole or making a part transparent may then be performed by not rendering the environment in a certain direction, e.g. within certain defined vector directions. This may align well with ray-tracing methods for rendering to determine what to render and what not (as parts of the 3D world may occlude each other). Another method may be to actually modify the virtual environment by "cutting away" the parts in the real-view area, e.g. if the 3D environment is built up out of meshes, just 'deleting' the meshes in this area. Any other method as known in the art may also be applied here, as various ways besides these mentioned here exist for doing so.

FIG. 13 shows a processing method for processing image data for rendering a virtual environment on a display system for a user. The user is present in a real environment. The method starts with stage REC, wherein head tracking data is received from a head tracking system. The head tracking data is indicative of at least the orientation of the head of the user in the real environment. Then, in stage REN 820 image data is generated for rendering a viewport of the virtual environment on the display system. The viewport is generated based on the head tracking data. Next, in stage RVA 840 at least one real-view area is defined in the virtual environment, and in stage BRA at least one boundary of the real-view area is determined. The boundary corresponds to predetermined coordinates in the virtual environment. Stages RVA and BRA together, as indicated by dashed box 810, enable that, in stage MVR 870, a corresponding part of the real environment is made visible in the real-view area. The part shows the real environment as perceived from the user head pose.

FIG. 14 shows a transitory or non-transitory computer readable medium, e.g. an optical disc 900. Instructions for the computer, e.g., executable code, for implementing one or more of the methods as illustrated with reference to FIG. 13, may be stored on the computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Figure 15:
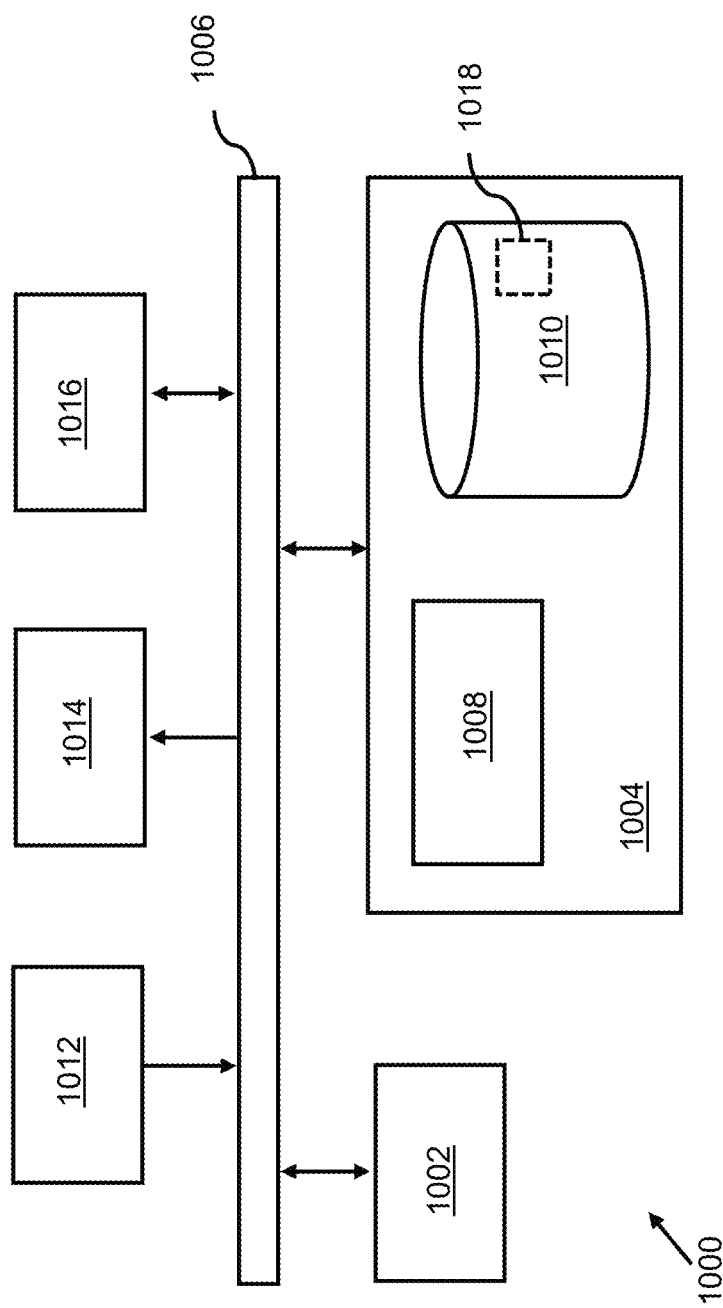
FIG. 15 shows an exemplary data processing system.

FIG. 15 shows a block diagram illustrating an exemplary data processing system that may be used in the embodiments of the processor system as described above. Such data processing systems include data and image processing entities described in this disclosure. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It will be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 may optionally be coupled to the data processing system. Examples of input devices may include, but are not limited to, for example, a microphone, a keyboard, a pointing device such as a mouse, a touchscreen or the like. Examples of output devices may include, but are not limited to, for example, a monitor or display, speakers, or the like. Input device and/or output device may be coupled to data processing system either directly or through intervening I/O controllers. A network interface 1016 may also be coupled to, or be part of, the data processing system to enable it to become coupled to other systems, computer systems, remote network devices, and/or remote storage devices through intervening private or public networks. The network interface may comprise a data receiver for receiving data that is transmitted by said systems, devices and/or networks to said data and a data transmitter for transmitting data to said systems, devices and/or networks. Modems, cable modems, and Ethernet cards are examples of different types of network interface that may be used with data processing system 1000.

As shown in FIG. 15, memory elements 1004 may store an application 1018. It should be appreciated that the data processing system 1000 may further execute an operating system (not shown) that may facilitate execution of the application. The application, being implemented in the form of executable program code, may be executed by data processing system 1000, e.g., by the processor 1002. Responsive to executing the application, the data processing system may be configured to perform one or more operations as described above in further detail.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

REFERENCES

[1] Milgram, Paul, et al. "Augmented reality: A class of displays on the reality-virtuality continuum." *Telemanipulator and telepresence technologies*. Vol. 2351. International Society for Optics and Photonics, 1995.
[2] McGill, Mark, et al. "A dose of reality: Overcoming usability challenges in yr head-mounted displays." *Proceedings of the 33rd Annual ACM Conference on Human Factors in Computing Systems*. ACM, 2015.
[3] Budhiraja, Pulkit, et al. "Where's my drink? Enabling peripheral real world interactions while using HMDs." *arXiv preprint arXiv:* 1502.04744 (2015).
[4] Günther, Tobias, Ingmar S. Franke, and Rainer Groh. "Aughanded virtuality-the hands in the virtual environment." 2015 *IEEE Symposium on 3D User Interfaces (3DUI)*. IEEE, 2015.
[5] Kanamori, Kohei, et al. "Obstacle avoidance method in real space for virtual reality immersion." 2018 *IEEE International Symposium on Mixed and Augmented Reality (ISMAR)*. IEEE, 2018.
[6] von Willich, Julius, et al. "You Invaded my Tracking Space! Using Augmented Virtuality for Spotting Passersby in Room-Scale Virtual Reality." *Proceedings of the 2019 on Designing Interactive Systems Conference*. ACM, 2019.
[7] Suma, Evan A., David M. Krum, and Mark Bolas. "Sharing space in mixed and virtual reality environments using a low-cost depth sensor." 2011 *IEEE International Symposium on VR Innovation*. IEEE, 2011.
[8] Simsarian, Kristian T., and Karl-Petter Akesson. "Windows on the world: An example of augmented virtuality." (1997).

What is claimed is:

1. Processor system for processing image data for rendering a virtual environment on a display system for a user, the user being present in a real environment, wherein the processor system comprises:
   an interface for receiving head tracking data from a head tracking system, wherein the head tracking data is indicative of at least the orientation including the pitch orientation of the head of the user in the real environment, and an image processor configured to:

generate image data for rendering a viewport of the virtual environment on the display system, the viewport being generated based on the head tracking data, thereby moving the viewport corresponding to head movements, define at least one real-view area in the virtual environment, determine at least one boundary of the real-view area, the boundary corresponding to predetermined coordinates in the virtual environment for making visible a corresponding part of the real environment in the real-view area, the part showing the real environment as perceived from the user head pose; and modify the coordinates of the boundary in the virtual environment based on a change of the position of the user in the real environment, wherein the boundary comprises a horizontal boundary comprising a separating line horizontal with respect to the virtual environment, while the real-view area is below the separating line, and the processor system is configured to maintain at least a part of the real-view area in the viewport by moving the horizontal boundary in the virtual environment when the pitch orientation of the head of the user as indicated by the tracking data exceeds a predetermined limit.

2. The processor system as claimed in claim 1, wherein the at least one boundary comprises a left separating line vertical with respect to the virtual environment and a right separating line vertical with respect to the virtual environment, the real-view area is between the left and right separating lines.

3. The processor system as claimed in claim 1, wherein the processor system comprises a camera interface for receiving camera data of the real environment as perceived from the user head pose from a camera mounted on the head of the user, and the image processor is arranged to show said part of the real environment in the real-view area based on the camera data.

4. The processor system as claimed in claim 3, wherein the image processor is configured to generate a data plane showing the camera data at least in the real-view area, and generate the image data of the virtual environment over the data plane outside of the real-view area, the data plane moving with respect to the real environment with head rotations and translations as indicated by the head tracking data.

5. The processor system as claimed in claim 3, wherein the image processor is configured to generate a local plane in the virtual environment on the position of the real-view area, and to show the camera data to the extent the camera data overlaps with the local plane.

6. The processor system as claimed in claim 3, wherein the image processor is configured to modify the camera data by adapting the scale or perspective for showing image data of the real environment as perceived from the user head pose.

7. The processor system as claimed in claim 1, wherein the image processor is configured to create a transition by showing, near the boundary, a combination of the virtual environment and the real environment.

8. Head mounted device comprising the processor system as claimed in claim 1, wherein the head mounted device comprises the display system.

9. The head mounted device as claimed in claim 8, wherein the device comprises a camera for providing camera data of the real environment, and the image processor is arranged to show said part of the real environment in the real-view area based on the camera data.

10. The head mounted device as claimed in claim 8, wherein the display system has a transparent part, and the image processor is configured to making visible said part of the real environment in the real-view area via the transparent part by not displaying image data in the real-view area.

11. The processor system as claimed in claim 1, wherein the moving the horizontal boundary in the virtual environment when the pitch of the head of the user as indicated by the tracking data exceeds a predetermined limit comprises putting the horizontal boundary higher in the virtual environment to maintain the at least part of the real-view area in the bottom part of the viewport when the head of the user looks up exceeding the predetermined limit.

12. The processor system as claimed in claim 1, wherein the moving the horizontal boundary in the virtual environment when the pitch of the head of the user as indicated by the tracking data exceeds a predetermined limit comprises putting the horizontal boundary lower in the virtual environment when the pitch of the head of the user exceeds the predetermined limit in downward direction, such that part of the virtual environment remains visible in the bottom part of the viewport.

13. Computer implemented processing method for processing image data for rendering a virtual environment on a display system for a user, the user being present in a real environment, wherein the method comprises:

receiving head tracking data from a head tracking system, wherein the head tracking data is indicative of at least the orientation including the pitch orientation of the head of the user in the real environment, generating image data for rendering a viewport of the virtual environment on the display system, the viewport being generated based on the head tracking data, thereby moving the viewport corresponding to head movements, defining at least one real-view area in the virtual environment, and determining at least one boundary of the real-view area, the boundary corresponding to predetermined coordinates in the virtual environment, for making visible a corresponding part of the real environment in the real-view area, the part showing the real environment as perceived from the user head pose;

modifying the coordinates of the boundary in the virtual environment based on a change of the position of the user in the real environment, wherein the boundary comprises a horizontal boundary comprising a separating line horizontal with respect to the virtual environment, while the real-view area is below the separating line, and maintaining at least a part of the real-view area in the viewport by moving the horizontal boundary in the virtual environment when the pitch orientation of the head of the user as indicated by the tracking data exceeds a predetermined limit.

14. A non-transitory computer-readable medium comprising a computer program, the computer program comprising instructions for causing a processor to perform the method according to claim 13.

15. The method as claimed in claim 13, wherein the moving the horizontal boundary in the virtual environment when the pitch of the head of the user as indicated by the tracking data exceeds a predetermined limit comprises putting the horizontal boundary higher in the virtual environment to maintain the at least part of the real-view area in the bottom part of the viewport when the pitch of the head of the user exceeds the predetermined limit in upward direction.

16. The method as claimed in claim 13, wherein the moving the horizontal boundary in the virtual environment when the pitch of the head of the user as indicated by the tracking data exceeds a predetermined limit comprises putting the horizontal boundary lower in the virtual environment when the pitch of the head of the user exceeds the predetermined limit in downward direction, such that part of the virtual environment remains visible in the bottom part of the viewport.

* * * * *

UNITED STATES PATENT AND TRADEMARK OFFICE
CERTIFICATE OF CORRECTION

PATENT NO. : 11,659,150 B2
APPLICATION NO. : 17/117764
DATED : May 23, 2023
INVENTOR(S) : Hans Maarten Stokking and Milan Wijnmaalen Page 1 of 1

It is certified that error appears in the above-identified patent and that said Letters Patent is hereby corrected as shown below:

On the Title Page

Item (72) Inventors:
Delete "Wijnmalen" and insert --Wijnmaalen--.

Signed and Sealed this
Twenty-seventh Day of February, 2024

Katherine Kelly Vidal
*Director of the United States Patent and Trademark Office*